May 16, 1933.  V. G. BATES  1,909,331
ANNEALING POT
Filed April 25, 1932
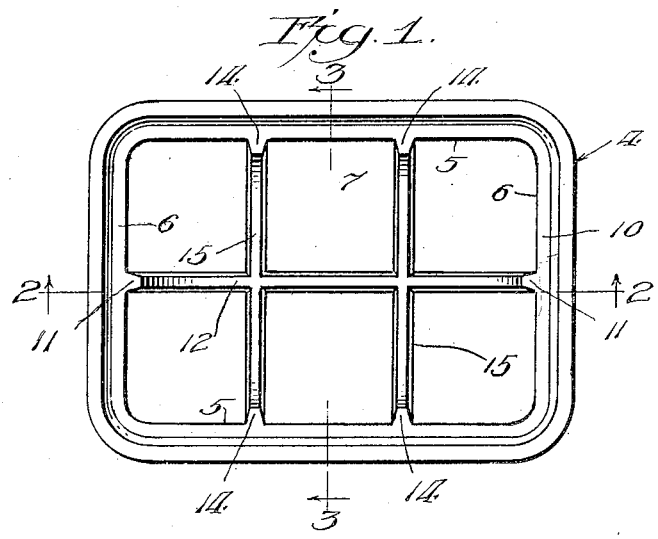
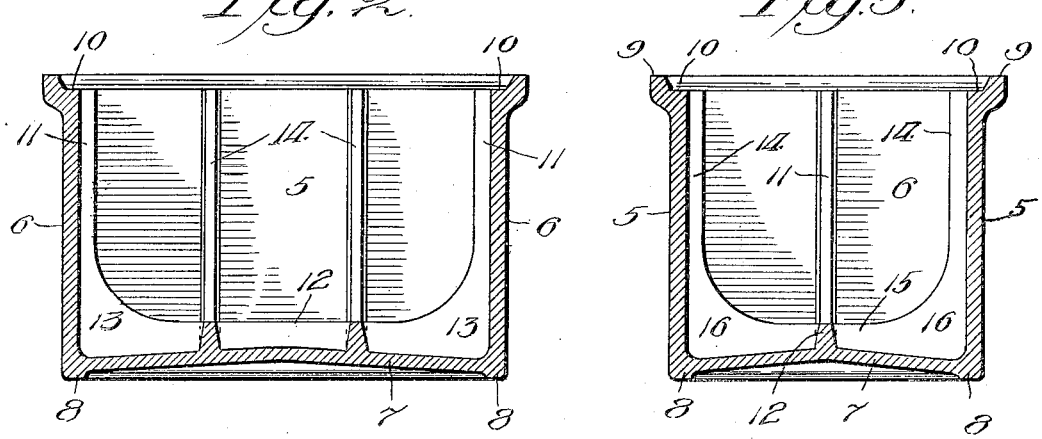
Inventor:
Vernon G. Bates
by Wm O Belt
Atty.

Patented May 16, 1933

1,909,331

UNITED STATES PATENT OFFICE

VERNON G. BATES, OF CHICAGO, ILLINOIS, ASSIGNOR TO THE AMERICAN BRAKE SHOE AND FOUNDRY COMPANY, OF NEW YORK, N. Y., A CORPORATION OF DELAWARE

ANNEALING POT

Application filed April 25, 1932. Serial No. 607,395.

This invention relates to annealing pots and it has for its object to reenforce and strengthen the pot to maintain it in shape and particularly to prevent the bottom from sagging so that the pot will not set properly.

It is well known that an annealing pot will grow in size both longitudinally and transversely and expand in use and that the bottom of the pot will sag under the weight of the castings in the pot and the heat of the annealing oven. Sometimes the bottom of the pot will sag so much that the pot will not set properly on a floor or on a roller conveyor and cannot be used without employing props or other supports which is a practice not considered practicable or desirable. Sometimes the bottom of a pot will sag so much that when the pot is arranged in a stack it will reduce the capacity of the pot upon which it rests. It will be understood of course that pots do not grow uniformly and therefore it often happens that one pot will not stack properly with other pots and this may not occur or be observed until several pots have been stacked.

My invention not only has for its object to retard the sagging of the bottom of the pot but it also has for its object to reenforce and strengthen the walls and the bottom of the pot to maintain the pot in its proper shape and thereby prolong its life and serviceable condition.

In the accompanying drawing illustrating a selected embodiment of the invention

Fig. 1 is a top plan view of the pot;

Fig. 2 is a longitudinal sectional view on the line 2—2 of Fig. 1; and

Fig. 3 is a transverse sectional view on the line 3—3 of Fig. 1.

Referring to the drawing, the pot 4 is substantially rectangular in shape having sides 5, 5 and ends 6, 6 joined by rounded corners. The bottom 7 of the pot is preferably crowned, as by inclining it upwardly from its sides and ends to its center, and it is provided at the edges of the bottom with a marginal rib 8. The top of the pot is flared at 9 and is provided interiorly with a shoulder seat 10 to receive the marginal rib 8 of another pot when they are stacked one upon the other. An integral longitudinal rib extends at 11, 11 from the shoulder 10 down the end walls of the pot and at 12 across the bottom of the pot. This rib is comparatively thin but is wider at the bottom than at the ends of the pot and it is greatly widened at the corners 13 where the ends join the bottom of the pot. One or more transverse ribs extend from one side to the other side and across the bottom of the pot and these ribs are made like the longitudinal rib comparatively narrow at the sides 14 and wide at the bottom 15 and greatly widened at the corners 16 where the sides join the bottom of the pot. These longitudinal and transverse ribs not only reenforce and strengthen the bottom of the pot to retard sagging but they also reenforce and strengthen the sides and ends and bottom of the pot to maintain the shape of the pot and retard growing under conditions of actual use so that the pot will be maintained throughout its life in substantially its original shape and size so that the pots will stack one upon the other in proper condition. It is primarily important that the bottom of the pot should be prevented from sagging as long as possible because a sagged bottom will destroy the equilibrium and stability of the pot and endanger a stack of which it forms a part and will also tend to cause the pot to rock and work off of a conveyor. Widening the ribs at the corners 13 and 16 is of special importance because it adds strength to the ribs for all purposes. Thus the end portions of the ribs cooperate with the intermediate bottom portions to restrain the bottom of the pot from sagging, and the intermediate bottom portions cooperate with the end portions to hold the ends and sides of the pot against material expansion; and the widened corners cooperate with the end portions and the intermediate portions of the ribs to add their strength to both portions of the ribs and to communicate the strength of one portion to the other portion. It is found that by widening the ribs as shown it is not necessary to thicken them, and comparatively thin ribs will serve the purpose. The ends of the ribs 11 and 14 have the effect of increasing the area of the seat 10 to facilitate stacking and to compensate for such limited expansion of the pot as is likely to occur when reenforced in accordance with my invention and within the normal life of a pot.

I have shown a rectangular pot of oblong shape in the drawing which is a popular shape but I reserve the right to embody the invention in pots of other shapes and to make any other changes therein within the scope of the following claim:

I claim:

An annealing pot having continuous ribs extending from top to bottom of its upright walls and across the bottom of the pot interiorly thereof, said ribs being widened at the bottom of the pot and greatly widened at the corners where the upright walls join the bottom of the pot.

VERNON G. BATES.